United States Patent [19]
Frihart et al.

[11] Patent Number: 5,194,638
[45] Date of Patent: Mar. 16, 1993

[54] RESINOUS BINDERS FOR USE IN INK COMPOSITIONS FOR INK JET PRINTING

[75] Inventors: Charles R. Frihart; Mark S. Pavlin, both of Lawrenceville, N.J.

[73] Assignee: Union Camp Corporation, Wayne, N.J.

[21] Appl. No.: 690,037

[22] Filed: Apr. 23, 1991

Related U.S. Application Data

[60] Continuation-in-part of Ser. No. 325,332, Feb. 17, 1989, abandoned, which is a division of Ser. No. 98,447, Sep. 18, 1987, Pat. No. 4,830,671.

[51] Int. Cl.$^5$ .................... C09F 5/00; C07C 233/00
[52] U.S. Cl. ...................................... 554/47; 564/153
[58] Field of Search .................. 260/404.5; 564/153; 554/47

[56] References Cited

U.S. PATENT DOCUMENTS 3,622,604  4/1969  Drawert et al. ............... 260/404.5
4,066,585  1/1978  Schepp et al. ................. 260/18 N

*Primary Examiner*—José G. Dees
*Assistant Examiner*—Keith MacMillan
*Attorney, Agent, or Firm*—William K. Wissing

[57] ABSTRACT

A resinous binder for use in hot melt ink compositions, which ink compositions may be used in hot melt ink jet printing applications, is disclosed. The resinous binder has a melt viscosity of 250 cps or less at 150° C., is sufficiently transparent to allow a colorant to be distributed through the resinous binder in an amount effective to impart a pre-determined color to the resulting hot melt ink composition, and has a blocking temperature greater than 100° C.

7 Claims, No Drawings

RESINOUS BINDERS FOR USE IN INK COMPOSITIONS FOR INK JET PRINTING

This is a continuation-in-part application of pending application Ser. No. 325,332, filed Feb. 17, 1989, now abandoned which is a divisional application of application Ser. No. 98,447, filed Sep. 18, 1987 of U.S. Pat. No. 4,830,671, granted on May 16, 1989.

This invention relates to resinous binders for use in ink compositions which are used in hot melt ink jet printing.

BACKGROUND OF THE INVENTION

Ink jet printing is a well known process for non-contact printing of substrates such as paper, plastic films, metal foils, and the like. In the operation of a typical ink jet printing apparatus, a stream of an ink composition is forced under pressure through a very small orifice by a drive means such as a driven piezoelectric crystal. After the stream of the ink composition is forced from the orifice, the stream separates into minute uniform size droplets. The droplets of the ink composition then receive an electrical charge. The charged droplets are deflected, causing selected droplets to impinge upon the substrate to be printed in a predetermined pattern to form a dot matrix image of the desired indicia on the substrate.

Various types of ink jet printing apparatus are known in the art. One of the more common types of ink jet printing apparatus provides a constant discharge of droplets of the ink composition in substantial excess of the amount actually required for printing, with the excess droplets being recovered and recycled. Another well known type of ink jet printing apparatus is referred to as a drop on demand printer. This type of apparatus, as the name indicates, discharges a stream of droplets of the ink composition only when required for printing. There are other types of ink jet printers known in the art, and all typically operate on the same general principles as that described above.

The various types of apparatus used for ink jet printing are relatively well developed from a mechanical standpoint. However, considerable problems are still encountered with ink jet printers. Many of the problems are related to the ink compositions heretofore suggested for use in ink jet printing. Ink compositions which are used in ink jet printing should have certain properties. Initially, in dispensing of the ink compositions during printing it is necessary that the ink compositions display a consistent breakup length, drop viscosity, and drop charge under the specific set of conditions employed during the ink jet printing process. To meet this requirement, the ink jet composition must have stable viscosity and resistive properties and should not dry out upon ageing. One of the major problems encountered with conventional prior art ink compositions is that they contain substantial amounts of either water or organic solvents which, upon standing, evaporate, causing the ink compositions to dry out and cake. This causes blocking of the orifices and considerable other problems in operation of ink jet printers. A further problem is that the loss of the volatile solvents causes the inks to increase in viscosity, which will cause substantial changes in the performance of the inks.

In addition to the unique requirements associated with ink jet printing, it is also necessary that the ink compositions used for ink jet printing have the usual desired printing properties that can be obtained with inks used in conventional printing processes. These properties include, for example, that the ink composition have satisfactory adhesion to the different types of substrates on which it may be printed. In addition, the indicia which is printed must have a high degree of resolution in order to provide the sharp images required for most printing applications. The ink composition must not rub or smudge on the substrate, and the printed indicia should likewise be permanent; that is, of archival quality.

A further problem in addition to those noted above associated with the presence of volatile solvents in the prior ink compositions used for ink jet printing is that the solvents cause the printed indicia to bleed into the substrates and result in poor resolution. To overcome this, the prior art resorted to the expedience of using coated papers which will not be wet out by the ink compositions. This is generally limited in practice because of the additional cost involved and the requirement in many commercial printing processes for "plain paper" printing. The use of large amounts of solvents in the ink composition likewise requires that the printed substrates be subjected to drying to remove the solvents. In the case of organic solvents, this has caused additional health and safety concerns.

Certain of the prior art ink compositions, in addition to containing solvents, also contain substantial amounts of wetting agents to allow the ink composition to wet out and saturate the substrate to be printed. These particular ink compositions tend to excessively wet out the substrates with solvents, and in turn cause bleeding with a resulting substantial reduction in the resolution of the printed indicia.

In typical conventional ink compositions for most other printing applications, that is, aside from ink jet printing, pigments are used as the colorants. Pigments are preferred to dyes because of the cost, consistent color quality and, more importantly, because of their outstanding permanency. However, because of the problems encountered with the prior art ink compositions used in ink jet compositions, it has not been possible to successfully use pigments in ink compositions for ink jet printing. Pigments can increase the viscosity of the ink, making it difficult to form small droplets. Dyes do not cause this problem, but require a transparent ink resin for color development.

What would be highly desirable would be an ink composition for ink jet printing which would be stable under ink jet printing conditions and which provides excellent print qualities such as high resolution pattern with a high contrast, excellent adhesion to the substrate, and also excellent archival properties.

In order to formulate an ink composition for ink jet printing, it is desirable to use a resin having a melt viscosity which is sufficiently low to facilitate passage of the ink jet composition through small orifices while at the same time, having sufficient blocking resistance and transparency properties for use in ink jet printing applications. Ink compositions must be resistant to blocking under conditions in which they are used, that is, the films formed by the ink compositions must be resistant to undesired cohesion to adjacent substrates, such as paper, ioning into contact with the printed-on indicia and to foreign particles, such as dust etc. Such conditions would include high temperature and/or humidity, whether present during application of the ink or subsequent thereto. Polyamide resins which are relatively transparent and have sufficient blocking resistance tend to have melt viscosities which are much too high to be used in an ink jet printing application. Those polyamide resins which have sufficiently low viscosity usually do not have the required blocking resistance. Those polyamide resins which do have sufficiently low viscosity and the desired blocking resistance for the ink jet printing applications are usually opaque due to their crystallinity.

Floyd, et al., U.S. Pat. No. 3,253,940 relates to polyamide resins and solutions thereof suitable for use as flexographic ink vehicles. The polyamide resins of Floyd are of relatively high viscosity, for example, about 1040 cps at 150° C., due to the higher ratio of dimer to monoacids (75:25 on an equivalence basis). Based on the formulation of the polyamide resins of Floyd, the calculated average molecular weight of the resins is about 2,000 g per mole.

Drawert et al., U.S. Pat. No. 3,622,604, discloses synthetic polyamides comprising dimeric fatty acids and methods for making the same. Like Floyd et al., the polyamide resins of Drawert et al. have relatively high molten viscosities of about 1290 cps at 150° C., due, again, to the higher ratio of dimer to monoacids (75:25 on an equivalence basis). Based upon the formulation of the polyamide resin in Drawert, the calculated average molecular weight will be slightly higher than that of the Floyd polyamide resin due to the high weight amines used in the Drawert polyamide resin.

Neither the resins of Floyd nor Drawert possess the required properties of low viscosity, blocking resistance and sufficient transparency, which are required in a resinous binder in order to produce ink compositions having the properties of stability and uniformity of performance under ink jet printing conditions. Such ink compositions are described in U.S. Pat. No. 4,830,671 (Frihart et al.). It is therefore an object of this invention to provide a resinous binder which satisfies the requirements of transparency, blocking resistance and low molten viscosity for producing such ink compositions.

SUMMARY OF THE INVENTION

It has been found that, in accordance with the present invention, a resinous binder comprising a polyamide hot melt adhesive which has a low viscosity at a low melt temperature, for example 250 cps or less at 150° C., and sufficient transparency and blocking resistance for use in ink jet printing compositions may be used to formulate hot melt ink compositions having properties of stability and uniformity of performance under ink printing conditions and desired printing properties. More particularly, it has been found that excellent results are obtained with hot melt ink compositions comprising a resinous binder of the formula

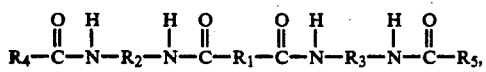

wherein $R_1$ represents a polymerized fatty acid residue with the hydroxyl moieties of two carboxylic acid groups removed; $R_2$ and $R_3$ are the same or different and each represents an alkylene with up to 12 carbon atoms, a cycloalkylene with 6 to 12 carbon atoms; or an arylene with 6 to 12 carbon atoms, and $R_4$ and $R_5$ are the same or different and each represents an alkyl having up to 36 carbon atoms, a cycloalkyl having up to 36 carbon atoms, or an aryl having up to 36 carbon atoms, wherein said resinous binder has a melt viscosity of 250 cps or less at 150° C. for hot melt ink jet applications, is sufficiently transparent to allow a colorant to be distributed through the resinous binder in an amount effective to impart a predetermined color to the resulting hot melt ink composition and has a blocking temperature greater than 100° C.

DETAILED DESCRIPTION OF THE INVENTION

The essential component of the ink composition of the present invention is preferably a resinous binder which is prepared by the condensation reaction of about one mole of the polymerized fatty acid, about two moles of a diamine and about two moles of a monocarboxylic acid. The principal product which is obtained as a result of the condensation reaction is itself considered unique and useful aside from its use in the hot melt ink compositions.

The polymerized fatty acids which are used in the preparation of the resinous binder are obtained by the polymerization of olefinically unsaturated monocarboxylic acids containing 16 to 23 carbon atoms, such as oleic acid, linoleic acid, linolenic acid, and the like. Dicarboxylic acids produced in this manner—that is, when two moles of the monocarboxylic acid are combined—are referred to as dimer acids. Processes for the production of dimer acids are well known to the art. $C_{36}$ dimer acids obtained by the dimerization of an unsaturated $C_{18}$ acid such as oleic acid, linoleic acid and mixtures thereof (e.g., tall oil fatty acids) are especially useful and advantageously employed for the preparation of the resinous binder. Such dimer acids have as their principal component a $C_{36}$ dicarboxylic acid and typically have an acid value in the range 180-215 and neutral equivalent from 265-310. Dimer acids containing less than 30% by weight by-product acids, including monobasic acids, trimer acids or higher polymer acids, are especially useful for this invention. It is even more advantageous if the dimer acid is hydrogenated prior to use. The dimer acids may also be molecularly distilled or otherwise purified to increase the $C_{36}$ dimer content to 90% or more.

The second reactant used in the preparation of the resinous binder is a diamine which can be represented by the formula

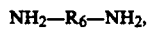

wherein $R_6$ represents an alkylene with up to 12 carbon atoms, a cycloalkylene with 6 to 12 carbon atoms, an arylene with 6 to 12 carbon atoms, or an alkarylene with 7 to 12 carbon atoms.

The diamines which are used in this invention are well known in the art, as is their preparation, and many are readily available commercially. The selection of the particular diamine for use in the preparation of the resinous binder of the present invention is dependent upon the properties desired in the hot melt ink compositions. It should be appreciated that use of different types of diamines in the preparation of the resinous binder will change the temperature and the viscosity at the melt point of the resinous binders which are obtained.

It has been found that the most preferred resinous binders used in this invention are prepared with lower alkylene diamines and particularly those having up to 6 carbon atoms. More particularly, it has been found that exceptional results are obtained with ethylene diamine or hexamethylene diamine. It is possible to use a mixture of diamines in the preparation of the resinous binder, but it has been found that more consistent results from batch to batch are obtained when a single type of diamine is used in the preparation.

The third reactant used in the preparation of the resinous binder is a monocarboxylic acid of the formula $$R_7-COOH,$$

wherein $R_7$ represents an alkyl having up to 36 carbon atoms, a cycloalkyl having up to 36 carbon atoms, an aryl having up to 36 carbon atoms or an alkaryl having up to 36 carbon atoms. The preferred monocarboxylic acids for use in the preparation of the resinous binder are fatty acids, and particularly saturated fatty acids, as these acids tend to form resinous binders which are tack free. One saturated fatty acid which has been found to be especially useful in this regard is stearic acid, as it provides an exceptionally tack free product.

A preferred method for the preparation of the resinous binder is to conduct the condensation reaction in a series of steps. In the initial step, one mole of the polymerized fatty acid is reacted with about two moles of the selected diamine, or mixture of diamines, in the presence of a catalyst, such as phosphoric acid, at a temperature of 150°-200° C. until the initial condensation reaction is completed. Thereafter, about two moles of the selected monocarboxylic acid, or mixture thereof, is added to the reaction mixture and the reaction continued until the second condensation reaction is completed.

An alternate method for the preparation of the resinous binder is to add all of the reactants at one time. In this particular method, the polymerized fatty acids, the diamine reactant and the monocarboxylic acid reactant are blended together in the presence of catalyst and heated at between 150°-200° C. until the reaction is completed. It has been found that the reaction product of this method is substantially the same as that obtained with the sequential addition as noted above. There are, however, minor amounts of other reaction products which would be anticipated from this particular type of preparation. However, the amounts of the additional products are not significant to diminish the unique combination of low viscosity, blocking resistance and transparency.

The resinous compositions produced in accordance with this invention are characterized by having physical properties which make them especially useful for use in hot melt ink jet printing compositions. In particular, the resinous binders of this invention have a relatively low melting point and consistent low melt viscosity. The resinous binders of this invention typically have a viscosity of 250 cps or less at 150° C., which makes them especially useful in hot melt ink jet printing applications. The relatively low melt viscosity, together with the stable properties under ink jet printing condition, make it possible to formulate ink jet compositions without volatile solvents which can be used over extended periods of time with consistent results. This type of result was not heretofore obtainable with the prior art ink compositions.

Another requirement of the resinous binder produced in accordance with this invention is that it must be sufficiently transparent so as to allow a colorant to be distributed through the resinous binder in an effective amount sufficient to impart a predetermined color to the resulting hot melt ink composition. Prior art resinous binders are limited in their ability to incorporate dyes into ink formulations and to yield resins of good color intensity, due to their relative opacity. The resinous binder of the present invention is generally higher in total transmittance, while being lower in diffuse transmittance and haze when compared to prior art resinous binders.

The resinous binders of the present invention must also exhibit sufficient blocking resistance, i.e. resistance to undesired adhesion to substrates such as paper, and to foreign particles. For purposes of this application, blocking resistance is measured by the blocking temperature of the resinous binders under conditions described hereinbelow. Under those conditions, the resinous binder of the present invention preferably has a blocking temperature of greater than 100° C., while maintaining low viscosity and sufficient transparency, as discussed herein. Other resinous binders prepared either have blocking temperatures below 100° C. and high viscosities, or, where blocking temperatures are in excess of 100° C. and viscosities are relatively low, the other resinous binder lacks sufficient transparency.

The resinous binders of the present invention have exceptional adhesion to a wide variety of substrates, including paper (both coated and uncoated), plastic film, and metal in the molten (hot metal) state, and form exceptionally strong bonds to the substrates when solidified. A further additional benefit of the resinous binder itself is that, because of the presence of the many polyamide linkages, the resinous binder is an excellent solvating agent for certain additives, including selected types of dyes.

The resinous binders most preferably used in hot melt ink composition are those wherein $R_2$ and $R_3$ are lower alkylene having up to 6 carbon atoms, and most preferably are ethylene or hexamethylene, and wherein $R_4$ and $R_5$ are saturated alkyl groups, with stearyl being the most preferable end group. The most preferred resinous binder for use in ink compositions is represented by the formula

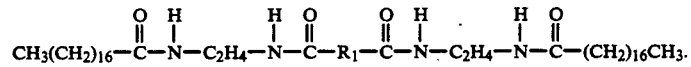

In printing ink compositions containing the above defined preferred class of resinous binder, an exceptional combination of stability during ink jet printing, high resolution printing pattern, excellent adhesion to printed substrate, and overall excellent print properties are readily obtained.

The second essential ingredient of the ink jet compositions is the colorant. The generic term colorant is specifically used in this specification in that it is intended to refer to both pigments and dyes which impart a distinct color to the composition used for ink jet printing. The purpose of any colorant is to provide contrast between the color of the substrate and the color of ink in order to provide a visually identifiable indicia on the substrate. In the prior art, with most ink jet compositions, it was necessary to use solubilized dyes as the colorant. The dyes were solubilized using a volatile solvent in the ink composition which would dissolve the dye so as to be miscible with the resin used as the binder in the ink composition. While soluble dyes do provide adequate colorant in certain situations, they are both less effective and clearly considerably more costly than the pigments typically used with conventional ink compositions. This is particularly true with regard to ink compositions which are desired to have archival properties.

It has been found that the colorant used in the hot melt ink compositions which utilize the resinous binder of the present invention can be either a dye or a pigment. It has also been found that it is possible to use a combination of both dyes and pigments to obtain a combination effect. In addition, many dyes can be effectively used in the ink compositions without the use of volatile solvents, in that the high concentration of amide linkages in the resinous binder has a significant solvating effect on many dyes.

The ink compositions, in addition to containing the resinous binder and a colorant, can advantageously contain additional conventional additives for imparting certain properties to the ink composition. One type of additive which is useful is a solvating agent for the dyes which is nonvolatile at the temperature at which the ink compositions will be printed. High melting plasticizer having a melting temperature above the temperature at which the ink composition will be printed can likewise be added to improve the mechanical properties of the ink compositions. A still further example of an additive which can be used are materials such as low viscosity waxes, and the like, which likewise are nonvolatile at the printing temperature, to reduce the viscosity of the ink composition. Other additives, such as agents to modify the conductivity of the ink composition, can also be added to the ink composition.

The ink compositions are prepared by physically blending together the components used to formulate the composition into a substantially homogeneous mixture. The components can be mixed in a finely divided state and then the mixture melted to complete the blending of the components together. It has been found, however, that it is preferable to initially melt the resinous binder and then blend each of the additives into the molten resinous binder. The resulting molten mixture is then cast into an appropriate size and shape for use in hot melt ink jet printers.

In the use of the hot melt ink compositions, the ink composition is initially heated in the ink jet printer to a temperature which is somewhat above the melting point of the ink composition, but below the temperature at which the components of the ink composition will volatilize or decompose. The molten ink composition is then fed into a printing head including heating elements for maintaining the ink composition in the molten state. The ink jet printing head is maintained at a predetermined temperature which is preselected for the printing process. As the ink composition is required to form a printed indicia on a substrate, it is dispensed in much the same manner as conventional ink compositions used in ink jet printing. The stream of the molten ink composition is forced from the orifice, and the droplets form as the ink composition is directed towards the substrate to be printed. The molten or semi-molten ink droplets then contact the substrate and adhere to the substrate. The temperature is generally selected so that the ink composition will almost immediately solidify on contact with the substrate and bond to the substrate. No further treatments are required to fix the printing indicia on the substrate. Any ink droplets which are not used in the printing process are recycled to the supply chamber where they are melted and reintroduced into the ink jet printer head. No substantial change has been noted in the performance of the ink composition over an extended period even though a substantial portion of the ink particles are recirculated in the printing process. In addition, it has been found that the use of the hot melt ink composition in the ink process prevents the formation of caking, or the like, at the orifice of the ink jet printers. If, upon shutting down the ink jet printer, any ink composition is left at the orifices, once the ink jet printer is restarted the heating elements in the ink jet printer head cause the deposited solidified ink composition to remelt and be useful in the printing process.

The following examples describe the manner of making the resinous binders of the present invention and set forth the preferred embodiment of the invention. They are not to be construed as limiting the scope of the present invention. Comparative samples of other polyamide binders are also given.

EXAMPLE 1

Resinous Binder of the Present Invention

An acid-terminated polyamide was prepared by adding 46.8 equivalent percent of a polymerized fatty acid (EMPOL TM 1010; Emery Corporation, Cincinnati, Ohio), 53.0 equivalent percent of stearic acid, 91.8 equivalent percent of ethylenediamine, 0.5 weight percent of NAUGUARD TM 524 (Uniroyal Chemical Corporation, Middlebury, Conn.), based on weight of the polyamide, and about 6 drops of phosphoric acid to a resin kettle. A nitrogen inlet, Baret trap, condenser and thermal couple were attached to the resin kettle head. The mixture was stirred and heated gradually to approximately 250° C. for about 3 hours. Once the ingredients had all been dissolved and thoroughly blended, the Baret trap and condenser were removed and vacuum was applied. The system was kept at a constant temperature of about 250° C. under vacuum for another 3 hours. The vacuum pressure was then released and the polyamide was poured onto release paper to cool.

The resulting polyamide had an acid number of 17 and an amine number of 0.4. The resulting polyamide was tested for melt viscosity, transparency, and blocking, as described hereinbelow. Results are found in Tables 1 and 2.

EXAMPLE 2: COMPARATIVE EXAMPLE

Following the procedure of Example 1, a polyamide as disclosed in U.S. Pat. No. 4,066,585, Example 3, was prepared using 40 equivalent percent of a polymerized fatty acid (UNIDYME TM 18, Union Camp Corp., Wayne, N.J.), 60 equivalent of percent stearic acid, 100 equivalent percent of ethylenediamine, 0.5% NAUGUARD 524 (based upon the weight of polyamide), and about 6 drops of phosphoric acid. The resulting polyamide product was tested for melt viscosity, blocking resistance and transparency as described hereinbelow. Results are found in Tables 1 and 2.

EXAMPLE 3: COMPARATIVE EXAMPLE

A polyamide was prepared according to Example 2 of U.S. Pat. No. 3,622,604 by adding 75 equivalent percent of a commercially available dimerized fatty acid prepared from an unsaturated $C_{18}$ fatty acid and having a content of about 75% dimeric fatty acid, 15% trimeric fatty acid, and 10% monomeric fatty acid, 25 equivalent percent of glacial acetic acid, 70 equivalent percent of ethylenediamine, and 30 equivalent percent of hexamethylenediamine, and heating with stirring to 125° C. over a period of about 15 minutes under a nitrogen atmosphere. This temperature was maintained for ½ hour, then the mixture was raised to 225° C. over a period of 2 hours and held at this temperature for 3 additional hours. A vacuum of 15 mm mercury was applied for 1 additional hour at a temperature of 225° C. The vacuum pressure was then released and the polyamide was poured onto release paper to cool. The resulting polyamide was tested for melt viscosity and blocking resistance, as described hereinbelow. Results are found in Table 1.

EXAMPLE 4: COMPARATIVE EXAMPLE

A polyamide resin was prepared according to Example II-2 of U.S. Pat. No. 3,253,940 by adding 77.7 equivalent percent of a polymerized tall oil fatty acids, 22.3 equivalent percent of acetic acid, 90 equivalent percent of ethylenediamine, and 10 equivalent percent of diethylenetriamine to a resin kettle. A nitrogen inlet, Baret trap, condenser and thermal couple were attached to the resin kettle head. The mixture was stirred and heated gradually to approximately 200° C. for about 3 hours. A vacuum of about 15-20 mm mercury was applied and held for about 1 additional hour. The vacuum was then released and the polyamide was poured onto release paper to cool. The resulting polyamide was tested for melt viscosity and blocking resistance, as described hereinbelow. Results are found in Table 1.

The following are procedures used to test the resulting polyamides of examples 1-4 for melt viscosity, transparency, and blocking resistance.

MELT VISCOSITY

The melt viscosities of the polyamides were measured at 150° C. using a Brookfield RVTD viscometer. Results are found in Table 1.

TRANSPARENCY

To prepare samples for transparency measurements, amounts of the polyamide resins sufficient to form sample disks having thicknesses of 0.05 inch, 0.09 inch, and 0.15 inch were placed in 2-inch diameter teflon petri dishes. The resins were placed in an oven at 190° C. and allowed to melt. The dishes were then removed and placed on a level surface, and the resulting material was allowed to cool to room temperature. The sample disks were then removed from the petri dishes and tested for transparency using a Hunter Ultrascan. The diffuse and total transmittance for each sample disk were measured using standard instrument procedures. Haze measurements were taken using standard instrument procedures, which procedures are similar to ASTM D-1003. Results are found in Table 2.

BLOCKING RESISTANCE

To prepare samples for blocking tests, the molten polyamide resins were drawn down on xerographic paper using a glass rod, and allowed to harden, thereby forming a film of approximately 1 mil thickness. A section of approximately 1 square inch was cut out of the film and covered with another square of paper containing no resinous film. About one pound per square inch pressure was applied to the samples. The samples were then heated at increasing temperatures for 18 hours to determine the blocking temperature of the resin. The blocking temperature is that temperature at which the section of paper containing the resin adheres to the section of paper containing no resin. The results are found in Table 1.

TABLE 1

| Example | Viscosity cps @ 190° C. | Blocking Temperature °C. |
|---|---|---|
| 1 | 55 | >100° C. |
| 2 | 90 | >100° C. |
| 3 | 1290 | <90° C. |
| 4 | 1040 | <100° C. |

TABLE 2

| RESIN | SAMPLE THICKNESS | TRANSPARENCY | | HAZE |
|---|---|---|---|---|
| | | Diffuse | Total | |
| Example 1 | 0.15 in. | 6.5% | 68.1% | 9.5% |
| Example 2 | 0.15 in. | 18.0% | 34.1% | 52.7% |
| Example 1 | 0.09 in. | 5.3% | 77.9% | 6.8% |
| Example 2 | 0.09 in. | 15.3% | 47.6% | 32.2% |
| Example 1 | 0.05 in. | 3.9% | 84.7% | 4.6% |
| Example 2 | 0.05 in. | — | 65.3% | — |

We claim:

1. A resinous binder for use in hot melt ink compositions, comprising:

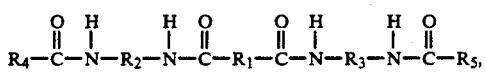

wherein $R_1$ represent a polymerized fatty acid residue with the hydroxyl moieties of two carboxylic acid groups removed; $R_2$ and $R_3$ are the same or different and each represents an alkylene with up to 6 carbon atoms, a cycloalkylene with 6 to 12 carbon atoms, or an arylene with 6 to 12 carbon atoms; and $R_4$ and $R_5$ are the same or different and each represents an alkyl having up to 36 carbon atoms, wherein said resinous binder has a melt viscosity of about 250 cps or less at 150° C., is sufficiently transparent to allow a colorant to be distributed through the resinous binder in an amount effective to impart a pre-determined color to the resulting hot melt ink composition, and has a blocking temperature greater than 100° C.

2. The resinous binder according to claim 1 wherein $R_2$ and $R_3$ are alkylene.

3. The resinous binder according to claim 1 wherein $R_2$ and $R_3$ are each ethylene radicals.

4. The resinous binder according to claim 1 wherein $R_2$ and $R_3$ are each hexamethyl radicals.

5. The resinous binder according to claim 1 wherein $R_4$ and $R_5$ each represent a saturated alkyl.

6. The resinous binder according to claim 1 wherein $R_4$ and $R_5$ are each stearyl.

7. A resinous binder for use in hot melt ink compositions, comprising:

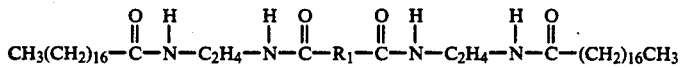

wherein $R_1$ represents a polymerized fatty acid residue with the hydroxyl moieties of two carboxylic acid groups removed and wherein said resinous binder has a melt viscosity of about 250 cps or less at 150° C., is sufficiently transparent to allow a colorant to be distributed through the resinous binder in an amount effective to impart a pre-determined color to the resulting hot melt ink composition, and has a blocking temperature greater than 100° C.

* * * * *